June 20, 1961 J. E. SIMON 2,989,250
ONE-HAND OPERATED, QUICK ACTING, GARDEN HOSE NOZZLE
Filed Aug. 19, 1959

INVENTOR.
JOSEPH E. SIMON
BY

United States Patent Office 2,989,250
Patented June 20, 1961

2,989,250
ONE-HAND OPERATED, QUICK ACTING, GARDEN HOSE NOZZLE
Joseph E. Simon, Melrose Park, Pa.
Filed Aug. 19, 1959, Ser. No. 835,168
1 Claim. (Cl. 239—456)

My invention relates to a nozzle for use in connection with a garden hose or other fluid dispensing device.

A conventional garden hose includes an outer rotary casing having a valve seat near the outer end thereof and a stationary valve stem having a valve head adapted to engage the valve seat to shut off the flow of fluid or to be moved away from said valve seat to permit the flow of fluid.

To open and close, or to adjust a conventional nozzle of the type referred to, the hose must be held with one hand while the outer casing is turned with the other hand to effect the desired adjustment. Not only is the use of both hands to make a simple adjustment primitive but, often, while the outer casing is being turned, the nozzle itself unscrews from the fitting at the end of the hose enough to produce a restricted orifice through which the person using the hose is splashed.

The object of this invention is to produce an improved nozzle which can be shut off, or controllably adjusted, by moving an operating handle at the outer end of the nozzle through a relatively short distance normal to the longitudinal axis of the nozzle itself with one finger of one hand and without any risk of unscrewing the nozzle itself from the end of the hose.

A still further object of the invention is to produce a nozzle which will possess the advantages above mentioned but which will be fool proof, inexpensive and durable.

The full nature of the invention will be understood from the following specification and the accompanying drawings in which.

Figure 1:
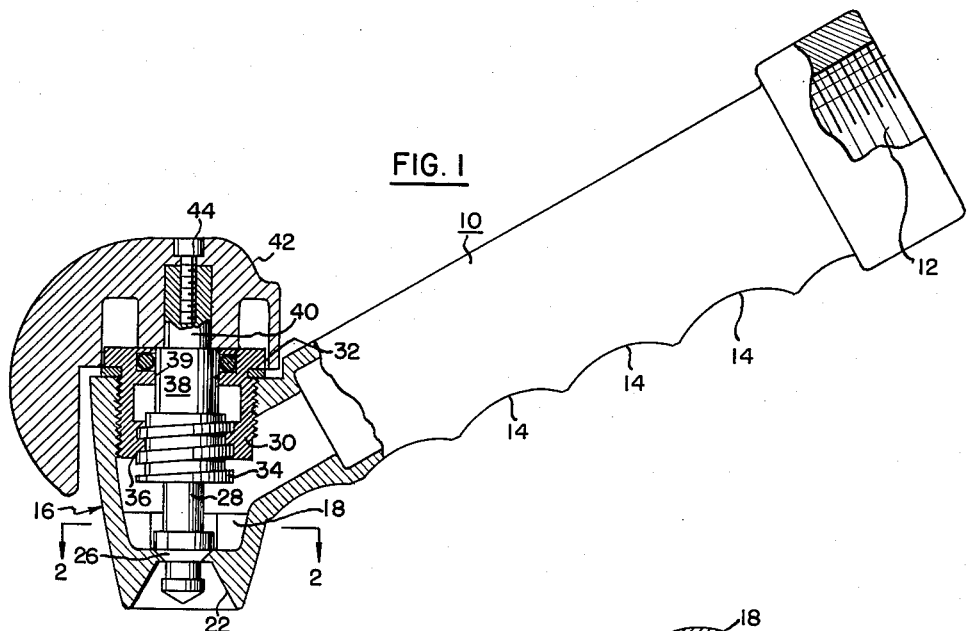
FIG. 1 is a vertical view, partly in elevation and partly in section showing a nozzle embodying my invention in the fully closed position.
Figure 3:
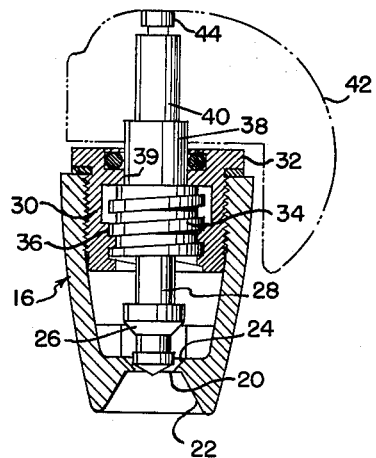
FIG. 3 is similar to the left hand portion of FIG. 1 but showing the nozzle in fully opened position.
Figure 2:
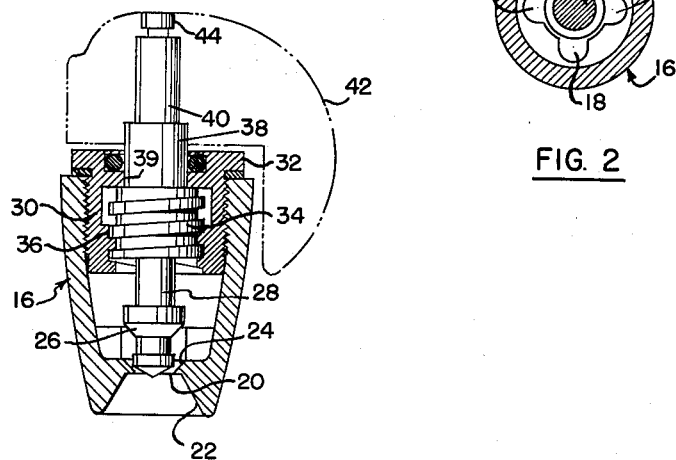
FIG. 2 is a section taken on line 2—2 on FIG. 1.

The improved nozzle of my invention includes a shank 10, one end of which is internally threaded as at 12 for detachable engagement with an external thread at the end of a hose or other appliance, not shown. Shank 10 serves as a conduit and as a handle and, therefore, one side of it is undulated, as at 14, to provide a comfortable grip. Shank 10 carries, or terminates in an end portion or head 16 which is in fluid flow relation with the interior of the shank. Near its discharge end, portion 16 is provided with recesses 18 which lead into opening 20 to facilitate the flow of fluid through conical discharge opening or outlet 22. Opening 20 is defined by a seat 24 which, in the fully closed position of FIG. 1, is engaged by conical valve 26 which is carried by valve stem 28. A sleeve, or bushing 30 fixedly engages head 16 and has a flange 32 which abuts the edge of said end portion. Bushing 30 is provided with a thread 36 adapted to be engaged by a thread 34 on valve stem 28 whereby rotation of the valve stem causes valve 26 to move toward, or away from, seat 24, depending on the direction of rotation. Valve stem 28 is provided with an enlarged portion 38 which rotates against an O-ring mounted in a groove in bearing surface 39 of sleeve 30 to provide a seal. Enlarged portion 38 terminates in a reduced portion 40 which is seated in a recess in operating handle member 42 to which it is secured by set screw 44.

Handle 42 is provided with a skirt which rotates on the edge of flange 32 of bushing 30 as a bearing. It will be noted that, with shank 10 gripped in the palm of the hand, handle 42 will be within easy reach of the thumb, or other finger, and that by merely turning the handle, the flow through outlet 22 can be stopped or it can be changed from a fine mist to a full stream. Since the movement of the valve stem 28 is at an angle to the flow of liquid, as distinguished from being opposed to it, the water pressure exerts no appreciable resistance to the movement of the valve. Also, since mounting and demounting the nozzle is effected by rotating it about one axis, and the movement of handle 42 is about another axis, the rotation of the handle will not tend to unscrew the shank from the hose to which it is attached. It will also be noted that the threads used are very coarse so that a little movement of handle 42 is enough fully to open or close passage 20.

What I claim is:

A one-hand operated, quick acting nozzle comprising a hollow shank attachable at one end thereof to a source of fluid and constituting a grip adapted to be grasped with one hand, a head carried by the other end of said shank, there being a discharge outlet in said head with its axis at an acute angle to the axis of said shank, a valve seat disposed inwardly of said outlet, an internally threaded sleeve, an externally threaded valve stem passing through said sleeve, a valve carried by one end of said stem and engageable with said seat to close said opening, the major portion of said sleeve being disposed out of the flow path of fluid from said shank to said outlet, and an operating handle located at the other end of said stem, and accessible to a finger of said hand, for rotating said stem to move said valve toward, and away from, said seat, the threads on said stem and said sleeve being relatively coarse whereby a relatively limited rotation of said handle by said finger is sufficient fully to open and close said outlet.

References Cited in the file of this patent

UNITED STATES PATENTS

| | | |
|---|---|---|
| 933,464 | Kasjens | Sept. 7, 1909 |
| 2,283,315 | Clemmons | May 19, 1942 |
| 2,289,889 | Stick et al. | July 14, 1942 |
| 2,519,737 | Brassington et al. | Aug. 22, 1950 |
| 2,539,041 | Scott | Jan. 23, 1951 |
| 2,719,994 | Dorsey | Oct. 11, 1955 |